United States Patent [19]
Abdelaal et al.

[11] Patent Number: 6,052,457
[45] Date of Patent: Apr. 18, 2000

[54] METHOD OF ROUTING UNIVERSAL INTERNATIONAL FREE TELEPHONE PHONE NUMBERS

[75] Inventors: Kathryn M. Abdelaal, Saylorsburg, Pa.; Andrew Frederick Bulfer, Mountain Lakes, N.J.; Peter H. Stuntebeck, Little Silver, N.J.; Roy Philip Weber, Bridgewater, N.J.

[73] Assignee: AT&T Corp., New York, N.Y.

[21] Appl. No.: 09/109,517

[22] Filed: Jul. 2, 1998

[51] Int. Cl.[7] ...................................................... H04M 7/00
[52] U.S. Cl. ............................ 379/220; 379/229; 379/912
[58] Field of Search ................................... 379/219, 220, 379/221, 229, 230, 912

[56] References Cited

U.S. PATENT DOCUMENTS

| | | | |
|---|---|---|---|
| 5,406,620 | 4/1995 | Pei | 379/220 |
| 5,754,640 | 5/1998 | Sosnowski | 379/221 |
| 5,764,749 | 6/1998 | Zelazny et al. | 379/220 |
| 5,892,822 | 4/1999 | Gottlieb et al. | 379/220 |
| 5,903,638 | 5/1999 | Welter, Jr. | 379/220 |
| 5,937,053 | 8/1999 | Lee et al. | 379/220 |

*Primary Examiner*—Harry S. Hong

[57] ABSTRACT

A method of handing off a Universal International Telephone Number to the correct international carrier for handling regardless of which carrier is given the call by the local exchange carrier. If a call destined for termination in the United States is handed off to the wrong international carrier, that carrier routes the call to its international gateway as if it were destined for another country. The international gateway then routes the call to the proper international carrier with all of the routing features and billing schedules of the customer intact.

8 Claims, 2 Drawing Sheets

METHOD OF ROUTING UNIVERSAL INTERNATIONAL FREE TELEPHONE PHONE NUMBERS

BACKGROUND OF THE INVENTION

The present invention relates generally to the field of telecommunications and related systems. More particularly, the invention is directed to a method for more effectively routing universal international free telephone phone numbers.

Recently, a new international standard numbering plan for toll free telephone numbers was developed and is known as the Universal International Freephone Number ("UIFN"). The UIFN allows a company or individual to have the same telephone number worldwide and have it work anywhere in the world. The format of UIFNs is, for example, 011-800-XXXX-XXXX.

Today, when a UIFN is dialed inside the United States, the Local Exchange Carrier ("LEC") does not have any way to determine which carrier the UIFN customer has chosen because there is no database from which the International Record Carrier ("IRC") of the UIFN call can be determined. Thus, the LEC routes the call to the Primary Interchange Carrier ("PIC") associated with that telephone. If the PIC is an international carrier, it then routes the call. If the PIC is not an international carrier, its hands the call off to an international carrier who routes the call.

In the United States, there are four international carriers: (1) AT&T; (2) MCI; (3) Sprint; and (4) LDDS. If the call is destined for termination inside the United States, the call would be routed to its destination by the carrier to which the PIC hands the call as discussed above, not the UIFN customer's carrier. This arrangement causes a number of problems. International carriers may not know where to route the call and simply be forced to drop the call. Other problems include the requirement that each UIFN customer may provision for terminations from all four international carriers. It may also mean that the customer receives up to four bills, one from each international carrier who handled their calls during the billing period. In addition, any contractual or usage discounts offered by the UIFN customer's carrier will most likely not be honored by the other three carriers and the customer probably would pay more for the calls completed by them.

One way to resolve the above noted problems is for each of the international carriers to share customer information. For a number of business reasons, however, sharing of customer information may not be practical.

Another problem associated with the UIFN plan as now implemented is that if Time-Of-Day routing, or other popular routing features are desired, a coordinated effort with all four international carriers is required both initially and whenever a routing or other change is made.

One method of routing international telephone traffic known in the prior art is disclosed in U.S. Pat. No. 5,406,620 which also is assigned to the assignee of the present application. This patent, however, describes only a method of routing calls between countries and does not disclose any techniques for routing UIFN calls. Accordingly, this patent does not resolve any of the above noted problems associated with UIFN call routing.

For the above reasons, the current implementation of the UIFN plan is not efficient and overly expensive to the customer. Accordingly, there is a great need in the art for an improved method of implementing the UIFN system.

SUMMARY OF THE INVENTION

Accordingly, it is an objective of the present invention to obviate the above-noted shortcomings and disadvantages of UIFN as presently implemented.

It is a further objective of the present invention to provide an improved method of handing off UIFN calls to the correct international carrier without imposing inconvenience to the user.

It is a still further objective of the present invention to provide an improved method of handing off UIFN calls to the correct international carrier which is economical to implement and simple in operation.

It is a further objective of the present invention to provide an improved method of handing off UIFN calls to the correct international carrier which is more economical to the consumer than prior art approaches.

It is a still further objective of the present invention to provide an improved method of handing off UIFN calls to the correct international carrier which can be readily implemented in the existing system.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

BRIEF DESCRIPTION OF THE PREFERRED EMBODIMENT

A preferred embodiment of the present invention will now be described with reference to the accompanying drawing.

In accordance with the present invention, Applicants have discovered a simple way to hand off each UIFN call to the correct international carrier for handling regardless of which carrier is given the call by the LEC. If the LEC hands off a call destined for termination in the United States to the wrong international carrier, that carrier routes the call to its international gateway as if it were destined for another country. At the international gateway, each of the other 3 carriers are handled as if it were a "virtual country."

A group of trunks are provisioned from the international gateway of one carrier to that of another carrier in a way that makes them look like they come from another country. The dialed UIFN number is then translated at the PICed carrier's international gateway into which "country" the call is destined for as is known in the prior art.

If the call is destined for completion in the United States, the PICed carrier sends the call over the inter-gateway trunk group to the international gateway of the proper carrier. From there, the call is routed to its destination as if it were coming from another country. This is the same way each international carrier is treated when a foreign exchange carrier sends the four U.S. international carrier toll free calls.

For example, if the UIFN dialed belongs to AT&T, and the caller is subscribed to MCI for long distance telephone service, the call is handled by the MCI network as if it were an international call and is routed to one of MCI's international gateway switching offices. There the UIFN is translated, by MCI in this example, to the "AT&T virtual country." The call is then forwarded by MCI's international gateway to AT&T's international gateway as if AT&T's gateway were another country. The call would be sent with identification digits and the called number just like it does when it arrives from a foreign administration. From there, the call is routed to its destination as if it were coming from another country with all of AT&T's advanced routing features intact and available.

The customer's bill for the call would come from AT&T with the proper discounts applied. Of course, AT&T would have to settle with MCI for handling the call but this would be outside of the customer's purview.

Figure 1:
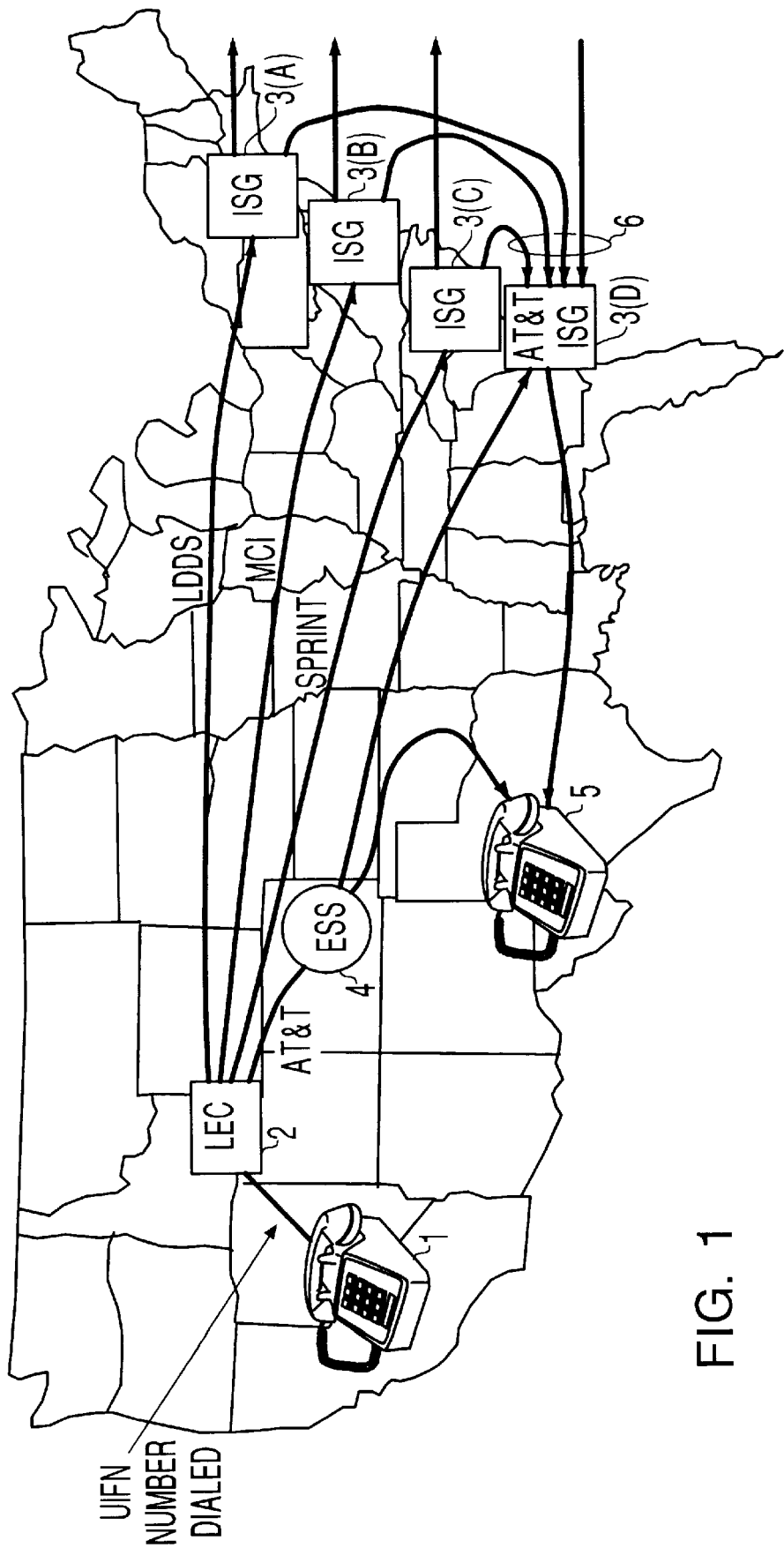
FIG. 1 is a block diagram illustrating the improved method of handing off UIFN calls in accordance with the present invention.

FIG. 1 is a block diagram illustrating the improved method of handing off UIFN calls in accordance with the present invention and as described above. A UIFN call 1 is initiated by the caller dialing the UIFN number. The call is received by LEC 2. The PICed IRC then routes the call to their international service gateway ("ISG"). For example, if the international carrier is LDDS, the call would be routed to ISG 3(*a*); if the international carrier is MCI, the call would be routed to ISG 3(*b*); and if the international carrier is Sprint, the call would be routed to ISG 3(*c*). If AT&T is the original PICed carrier and no advanced features are required, the call is routed directly to the termination point 5 via Electronic Switching System 4. Otherwise, the call is routed to ISG 3(*d*).

Calls routed to ISG(a)–(d) are then handed off to the proper carrier based on the dialed number. FIG. 1 illustrated calls 6 from ISG(a)–(c) being handed off to AT&T ISG(d) as an example. The calls are then routed from ISG(d) to the termination point 5.

Figure 2:
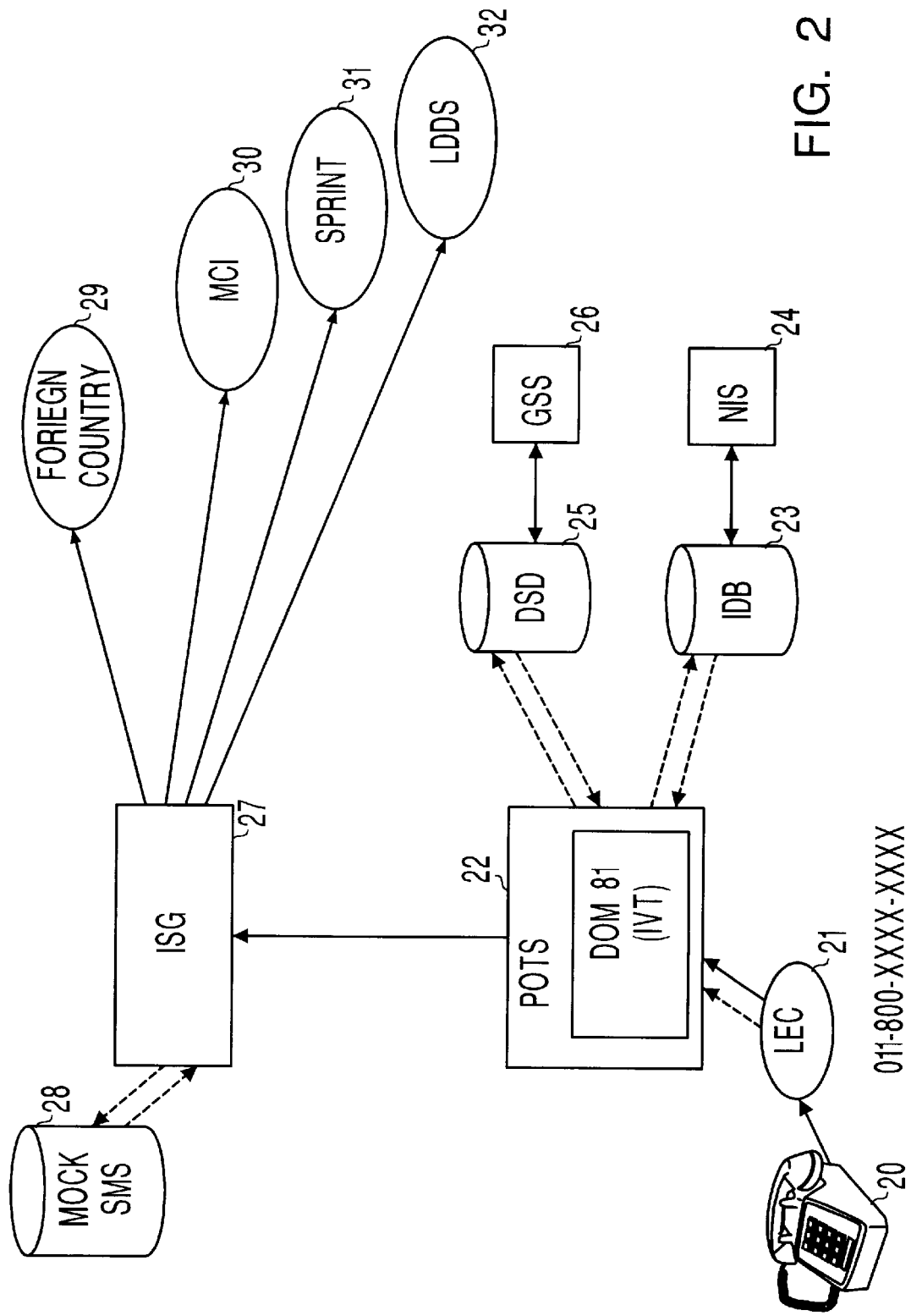
FIG. 2 is a further block diagram illustrating the present invention in more detail.

FIG. 2 illustrates an example of the flow of a UIFN telephone which is PICed to AT&T. A user 20 dials the UIFN number, for example, 011-800-xxxx-xxxx, which is processed by Local Exchange Carrier ("LEC") 21. LEC 21 send the call to Electronic Switching System ("ESS") system 22. ESS 22 then sends an inquiry to Inwatts Database ("IDB") 23 which provides normal 800 number routing information. Inwatts Database 23 is managed by Network Information System 24. If advanced 800 number service or complex routing information is required, ESS 22 sends an inquiry for such information to Direct Service Dialing ("DSD") system 25 and Global Service System ("GSS") 26. In accordance with additional routing information from Mock Service Management System 28, the call is routed to AT&T's International Service Gateway ("ISG") 27 or directly to the termination point. If the call is routed to ISG 27, it can be handed off to a foreign country 29, MCI 30, Sprint 31 or LDDS 32.

For calls from telephones that are PICed to carriers other than AT&T, each IRC are treated as a "Virtual Country" and are routed with advanced features accordingly.

Applicants' invention provides better handling of the call, a single bill to the customer, a single set of terminating arrangements, properly handled customer discounts, and the potential for advanced routing features. In order to implement Applicants' method and achieve maximum efficiency and cost advantage, the international carriers which join in the arrangement must negotiate pairwise arrangements with each other.

In accordance with the present invention, the disclosed method of handing off a UIFN call to the correct international carrier is far superior to the method used in the prior art. Applicants' method can be readily and economically implemented with substantial cost advantages to the customer. Moreover, implementation can be achieved without customer involvement. In addition, there are no performance penalties for the customer. The customer is affected only by the benefits of the implementation.

It should be obvious from the above-discussed apparatus embodiment that numerous other variations and modifications of the apparatus of this invention are possible, and such will readily occur to those skilled in the art. Accordingly, the scope of this invention is not to be limited to the embodiment disclosed, but is to include any such embodiments as may be encompassed within the scope of the claims appended hereto.

We claim:

1. A method of routing a customer UIFN call dialed to a UIFN telephone number, said method comprising the steps of:

distinguishing between a plurality of international carriers having respective international service gateways for routing telephones calls;

selecting a first one of said international carriers to route said UIFN call;

routing said UIFN call to said first international carrier;

determining whether said first international carrier should route said UIFN call to said UIFN telephone number or to said first international carrier's international service gateway;

routing said UIFN call to said UIFN telephone number or to said first international carrier's international service gateway in accordance with said determination; and routing said UIFN call received by said first international carrier's international service gateway to the international service gateway of a second one of said plurality of international carriers for routing to said UIFN telephone number.

2. The method of claim 1 further including the step of assigning a primary international carrier to the telephone from which said UIFN call originates, wherein said primary international carrier is oneof said plurality of international carriers.

3. The method of claim 2 further including the step of selecting said second one of said plurality of international carriers in accordance with the assigned said primary international carrier.

4. The method of claim 1 further including the step of processing said UIFN call at said international gateways as if said UIFN call originated from a foreign country.

5. The method of claim 1 further including the step of selecting said second one of said plurality of international carriers as if said UIFN call originated from a foreign country.

6. The method of claim 2 further including the step of routing said UIFN call between said first and said second international carriers with all of the routing features of said primary international carrier available.

7. The method of claim 2 further including the step of routing said UIFN call between said first and said second international carriers in accordance with all of the billing schedules of said primary international carrier.

8. The method of claim 7 further including the step of compiling all of the customer billing charges for routing said UIFN call to its destination for presentment to the customer in a single bill.

* * * * *